US012644419B2

(12) United States Patent
Smith et al.

(10) Patent No.: US 12,644,419 B2
(45) Date of Patent: Jun. 2, 2026

(54) DECOKING

(71) Applicant: ROLLS-ROYCE plc, London (GB)

(72) Inventors: James A T Smith, Lincoln (GB);
Jonathan D Griffiths, Lincoln (GB)

(73) Assignee: ROLLS-ROYCE PLC, London (GB)

( * ) Notice: Subject to any disclaimer, the term of this patent is extended or adjusted under 35 U.S.C. 154(b) by 23 days.

(21) Appl. No.: 18/746,616

(22) Filed: Jun. 18, 2024

(65) Prior Publication Data

US 2024/0426248 A1 Dec. 26, 2024

(30) Foreign Application Priority Data

Jun. 23, 2023 (GB) ...................................... 2309493

(51) Int. Cl.
| | |
|---|---|
| *B08B 3/00* | (2006.01) |
| *B08B 7/02* | (2006.01) |
| *B08B 13/00* | (2006.01) |
| *F02C 7/30* | (2006.01) |

(52) U.S. Cl.
CPC .................. *F02C 7/30* (2013.01); *B08B 3/00* (2013.01); *B08B 7/028* (2013.01); *B08B 13/00* (2013.01); *F05D 2260/607* (2013.01)

(58) Field of Classification Search
CPC ... F02C 7/30; B08B 3/00; B08B 7/028; B08B 13/00; F05D 2260/607
See application file for complete search history.

(56) References Cited

U.S. PATENT DOCUMENTS

| | | | |
|---|---|---|---|
| 6,663,718 B1 | 12/2003 | Mush | |
| 2010/0326465 A1 | 12/2010 | Miraglia | |
| 2017/0130649 A1 | 5/2017 | Bewlay et al. | |
| 2017/0165721 A1* | 6/2017 | Tibbetts | ................... B64F 5/30 |
| 2022/0090537 A1 | 3/2022 | Pritchard, Jr. et al. | |
| 2024/0426248 A1* | 12/2024 | Smith | ...................... F02C 7/30 |

FOREIGN PATENT DOCUMENTS

| | | |
|---|---|---|
| CN | 106422794 A | 2/2017 |
| CN | 108856136 A | 11/2018 |
| WO | 2017/111889 A1 | 6/2017 |
| WO | 2022/123115 A1 | 6/2022 |

OTHER PUBLICATIONS

Machine Translation of CN217141492U (Year: 2022).*
Lais, H., Lowe, P.S., Gan, T.H. and Wrobel, L.C., 2018. "Numerical modelling of acoustic pressure fields to optimize the ultrasonic cleaning technique for cylinders," Ultrasonics sonochemistry, 45, pp. 7-16.

(Continued)

*Primary Examiner* — Sharidan Carrillo
(74) *Attorney, Agent, or Firm* — Oliff PLC

(57) ABSTRACT

A decoking cleaning system for cleaning at least one component in-situ within a combustion engine system, the decoking system including at least one ultrasonic transducer with a means of connecting the at least one ultrasonic transducer to a component to be cleaned within the combustion engine system, the at least one ultrasonic transducer being connected to a power and voltage supply.

8 Claims, 5 Drawing Sheets

(56) References Cited

OTHER PUBLICATIONS

Figure 1:
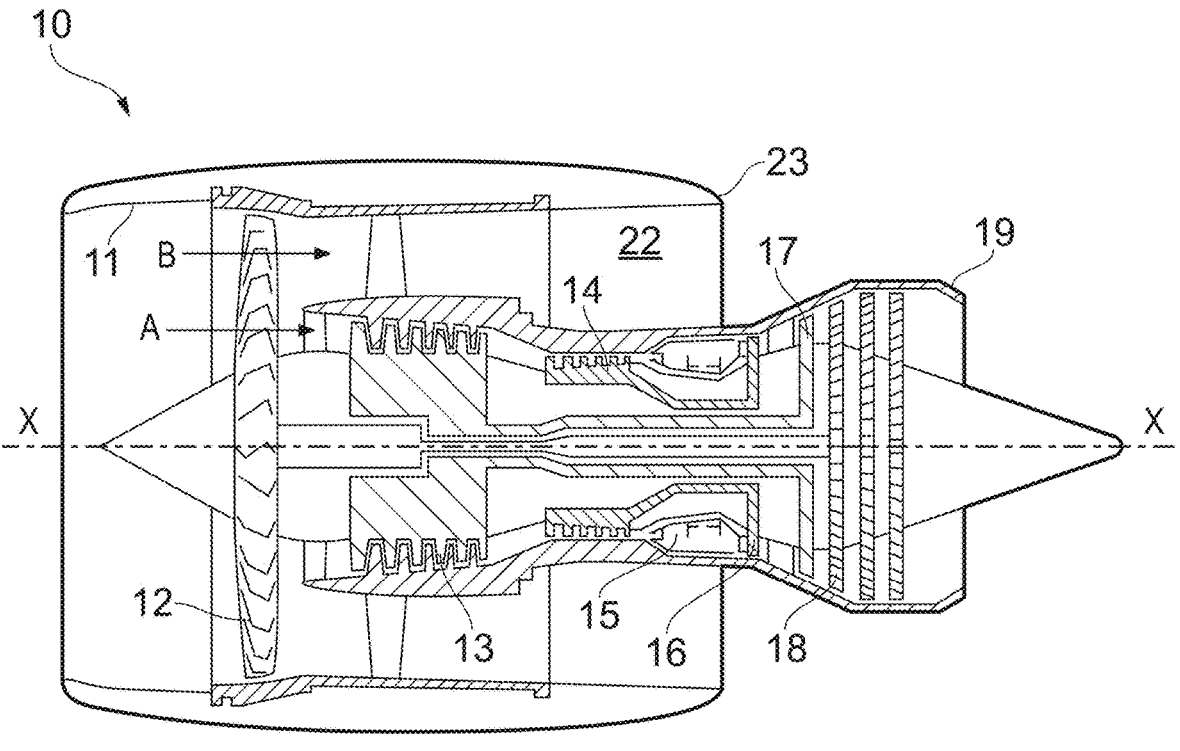

O. Altin and S. Eser, "Characterization of Carbon Deposits from Jet Fuel on Inconel 600 and Inconel X Surfaces," Industrial Engineering Chemical Research, vol. 39, No. 3, pp. 642-645, 2000.

Y. Zhou, S. Searle and N. Pavlenko, "Current and future cost of e-Kerosene in the United States and Europe," International Council on Clean Transportation, vol. March, No. 1, pp. 1-14, 2022.

I. Velkavrh, I. Palamarciuc, D. D. A. Gelu, J. Brenner, C. Gabler, B. Mellor and M. Ratoi, "Formation of Surface Deposits on Steel and Titanium Aviation Fuel Tubes under Real Operating Conditions," American Chemical Society, ACS Omega, pp. 1-44, 2019.

E. Moreno, M. Acevedo, M. Fuentes, A. Sotomayor, L. Borroto, L. Villafurete and L. Leija, "Design and Construction of a Bolt-Clamped Langevin Transducer," in 2nd International Conference on Electrical and Electronic Engineering (ICEEE) and XI Conference on Electrical Engineering (CIE 2005), Mexico City, 2005.

M. Janer, X. Planta and D. Riera, "Ultrasonic moulding: Current state of the technology," Ultrasonics, vol. 102, pp. 1-14, 2020.

Prokic, M, "Piezoelectric Converters Modeling and Characterization," MPI Ultrasonics—sonic and ultrasonic processing, p. 266, Aug. 2004.

L. Svilainis and G. Motiejunas, "Power amplifier for ultrasonic transducer excitation," Ultragarsas (Ultrasound), vol. 58, No. 1, pp. 30-36, 2006.

IEEE, "Standard Definitions and Methods of Measurement for Piezoelectric Vibrators," IEE, New York, 1966.

Guo, C. and Zhu, X., 2018. Effect of ultrasound on dynamics characteristic of the cavitation bubble in grinding fluids during honing process. Ultrasonics, 84, pp. 13-24.

Sep. 18, 2023 Search Report issued in British Patent Application No. 2309493.1.

* cited by examiner

DECOKING

This specification is based upon and claims the benefit of priority from UK Patent Application Number 2309493.1 filed on 23 Jun. 2023, the entire contents of which are incorporated herein by reference.

BACKGROUND

Overview of the Disclosure

The disclosure relates to a system for decoking components in a combustion system. The method further relates to a method for components within a combustion system.

Background of the Disclosure

The combustion of fuels is used in a large number of transport and power systems. In these a fuel, typically a hydrocarbon, is fed into a combustion chamber where it is ignited to release the energy. The energy produced by the combustion of the supplied fuel is then typically used to either drive a turbine or a piston; this motion is then used to provide a usable power that can be utilised, for example in moving a vehicle or generating electricity. The benefits of such systems are that they are relatively simple in operation as well as being tried and tested. Furthermore, they do not require the use of dangerous materials which could be hazardous in the event of an accident.

Despite combustion systems being widely used and well researched there are still issues with fuel and or combustion by-products being deposited around areas of the engine. One particular issue is that of coking in which the fuel and/or oil that is used within the engine separates into its constituent parts at high temperatures and forms residues and/or deposits that can adhere to the components; this process is called coking. Coking can be present within the fuel lines or within the combustor, exhaust, or in systems that utilise oil for cooling or lubrication. Over time, the accumulation of the coking deposits within these areas reduces the performance of the engine and can potentially cause damage to the engine. It is therefore desirable to develop a system and method that is capable of reducing or removing the build-up of these coking products within a combustion system. Thus, reducing the fall off in performance of the engine over time and act to minimise the cost of repair and overhaul of the engine.

SUMMARY OF THE DISCLOSURE

The scope of the disclosure is set out in the appended claims.

According to a first aspect of the disclosure there is presented a decoking cleaning system for cleaning at least one component in-situ within a combustion engine system, the decoking system comprising at least one ultrasonic transducer with a means of connecting the at least one ultrasonic transducer to a component to be cleaned within the combustion engine system, the at least one ultrasonic transducer being connected to a power and voltage supply.

The at least one ultrasonic transducer may be further connected to an amplifier, a waveform generator and wherein the voltage source is tunable.

The resonant frequency may be tracked by altering the frequency of excitation using an MPPT type algorithm to find and track resonance of the component as temperature varies. Alternatively, the resonant frequency may also be tracked by determining the complex impedance or voltage and current phase difference.

The resonant frequency may be maintained by using a DC bias.

The decoking system may be further connected to a computer running a program that determines the cleaning program required and the duration of the cleaning program that the component undergoes.

The cleaning length of the cleaning program may be determined by at least one of the following factors:
  a. the likelihood of coking within the component,
  b. engine run time and operational information,
  c. the previous cleaning schedule of the component,
  d. the available time for the cleaning process to take place
  e. temperature: historical data on engine temperature and/or cleaning temperature,
  f. ambient pressure,
  g. fluid velocity in pipe,
  h. consideration of any additives that may be introduced,
  i. fluid type(s).

The at least one transducer may be a Langevin type or Tonpilz transducer.

The at least one Langevin type or Tonpilz transducer may be connected to the component via a saddle clamp having at least one anvil adapter.

There may be a plurality of ultrasonic transducers connected to either the same component or different components within the combustion engine.

Different types of transducers may be used on different components or different sections of the same components within the combustion engine.

Different transducers may be instructed to run differing cleaning programs.

The separate transducers may be independently addressable.

According to a second aspect of the disclosure there is presented a method of decoking a combustion engine having at least one ultrasonic transducer, the method comprising:
  determining a length of time for the cleaning process based upon at least one of, likelihood of coking, engine run time and operational history, previous cleaning history of the component, and/or the available time for running a cleaning process,
  filling the component with a fluid,
  providing an alternating voltage and current to the transducer for the determined time,
  stopping the supply of the alternating voltage and current to the transducer.

The alternating current and voltage may be supplied by a tunable voltage source and passed through a waveform generator to drive the transducer at the resonant frequency of the system.

The fluid that fills the component may be flowing or static.

There may be a plurality of transducers on the same or different components of the combustion engine, which are individually addressed with the same or different cleaning programs.

The transducers may be clamped to the external surface of the component to be cleaned during a scheduled maintenance service.

The transducers may be permanently connected to the component within the combustion engine.

The skilled person will appreciate that except where mutually exclusive, a feature described in relation to any one of the above aspects may be applied mutatis mutandis to any other aspect. Furthermore, except where mutually exclusive any feature described herein may be applied to any aspect and/or combined with any other feature described herein.

BRIEF DISCUSSION OF THE FIGURES

Figure 2:
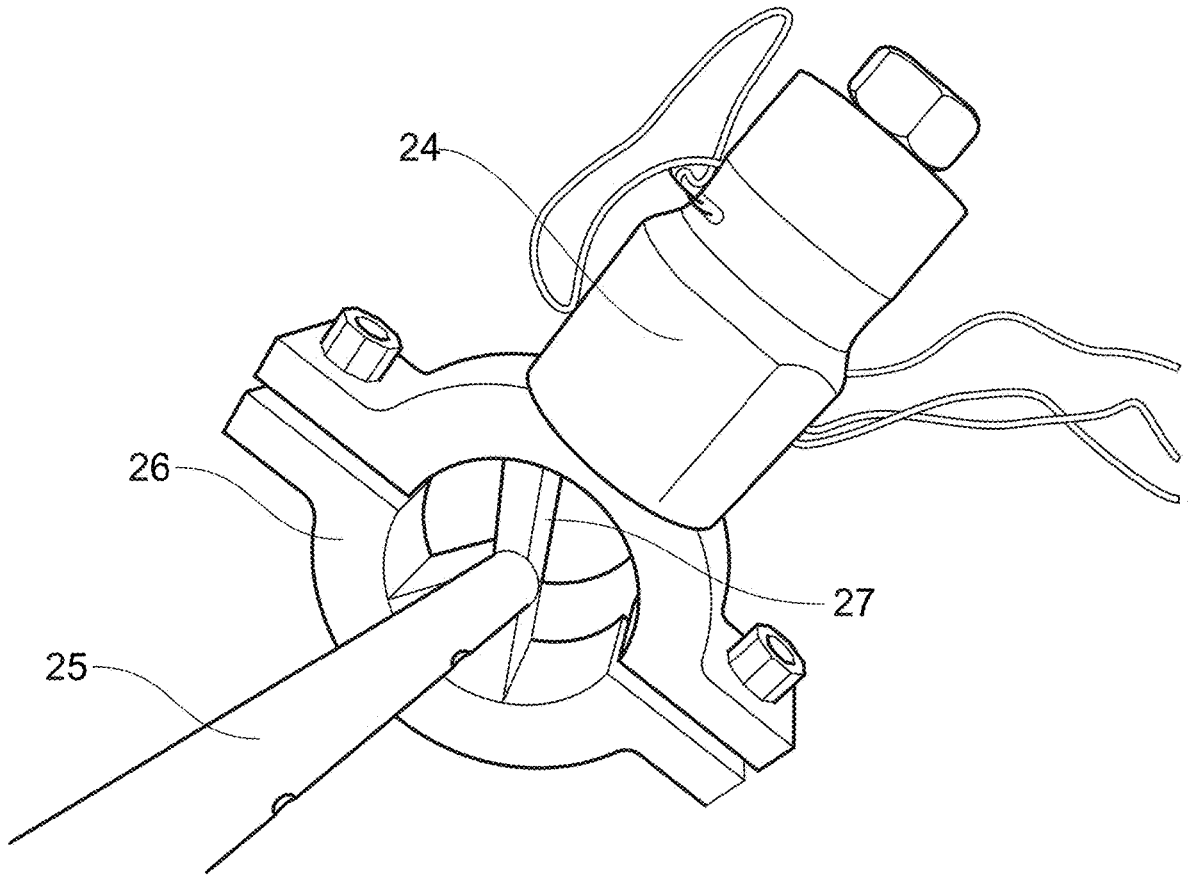
Figure 3:
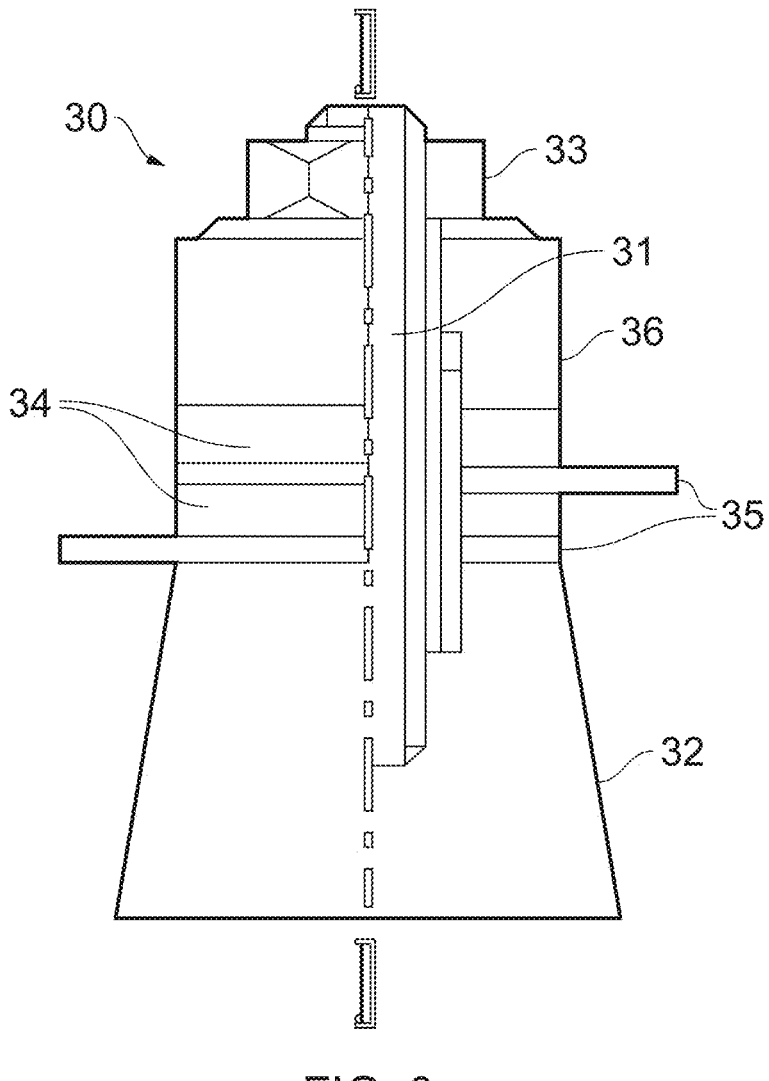
Figure 4A:
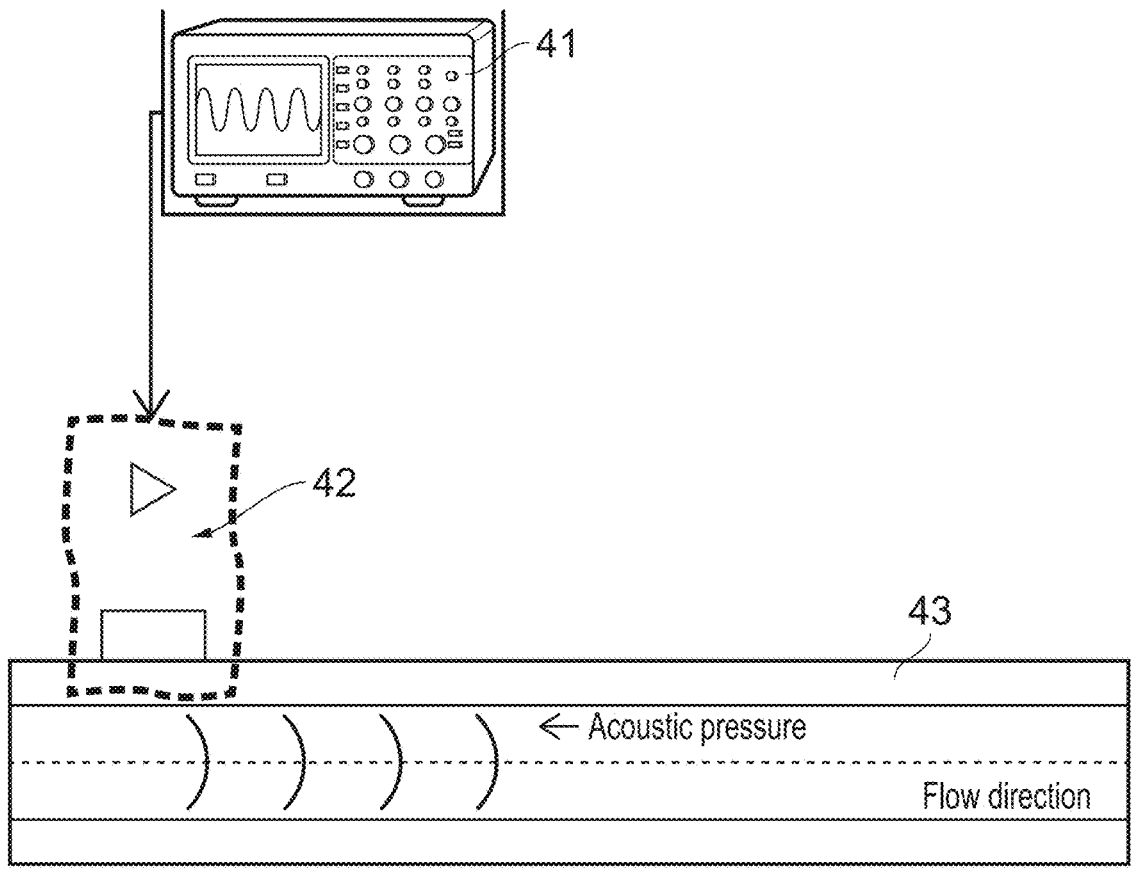
Figure 4B:
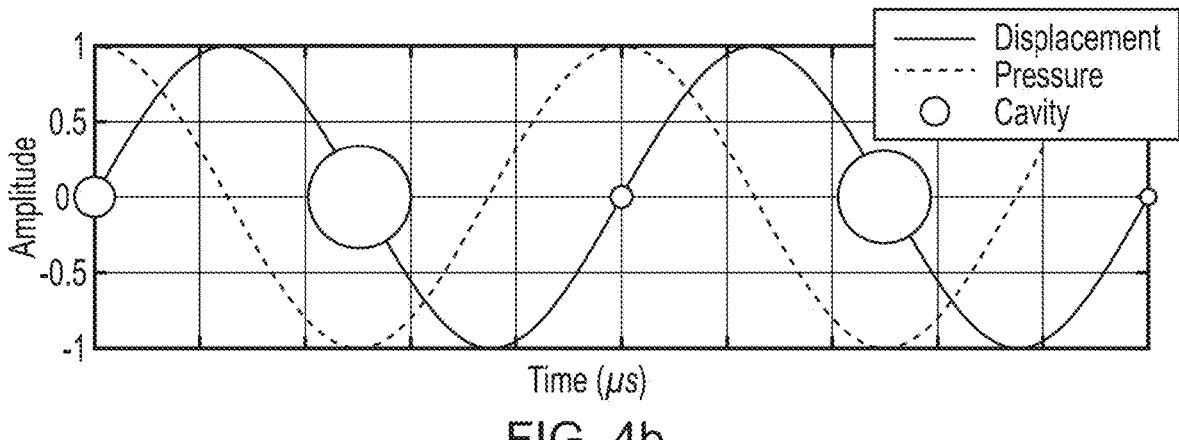

Embodiments will now be described by way of reference only, with reference to the figures in which:

FIG. 1 is a sectional side view of a gas turbine engine;

FIG. 2 presents an example of single Langevin transducer mounted to a pipe using saddle clamp;

FIG. 3 presents an example of Langevin transducer;

FIG. 4*a* presents a schematic example of the disclosure;

FIG. 4*b* presents an example of cavitation within the system; and

Figure 5:
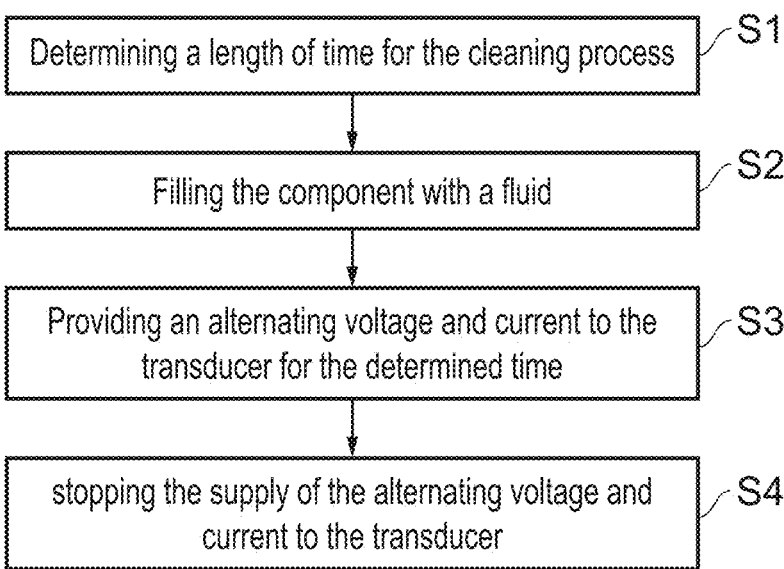

FIG. 5 presents a flow chart of a method of operation of the disclosure.

DETAILED DESCRIPTION OF THE DISCLOSURE

Aspects and embodiments of the present disclosure will now be discussed with reference to the accompanying figures. Further aspects and embodiments will be apparent to those skilled in the art.

With reference to FIG. 1, a ducted fan gas turbine engine that may incorporate the invention is generally indicated at 10 and has a principal and rotational axis X-X. The engine comprises, in axial flow series, an air intake 11, a variable pitch propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts. The disclosure may also be suitable for gas turbines featuring a power gearbox to reduce the fan speed relative to the speed of the turbine.

Although FIG. 1 presents the case of an aero gas turbine engine it will be appreciated that the disclosure could also work on any suitable engine, for example, this could be an internal combustion engine or a power generation turbine engine. Throughout these engines, in all of the cases, there are a number of pipes that supply fuel or coolant, at least one combustion and exhaust system and all the associated filters or linked components (i.e., bearings and their races, seals). During operation of the engine some of these components get hot through their function (i.e., bearing races and combustor parts), and some get hot due to their location within the engine (i.e., those that are located close to the combustion area).

Depending upon the nature of these pipes or components they may be prone to accumulating deposits of coke or carbon residues. Coking is a particular issue in which the fuel and/or oil separates out into its constituent parts at high temperatures without burning. These constituent parts can form a residue or particles. If the separated particles or residue contacts the surface of a component assembly, it may rest there and form a deposit on that surface or attach to a previously formed deposit within the component. These deposits can be detrimental to the performance of both the component and the engine as a whole. This is because these accumulations can reduce the diameter of the pipe or can block areas of a filter or of injectors. Furthermore, larger flakes of the coke deposit may break off from the surface and can then be carried by the oil or fuel to another area of the associated system where they may cause a blockage or abrasion of sensitive or delicate components; this could potentially result in failure of the component or potentially of the engine itself. Coking of fuel and/or oil can be an issue during operation and during shutdown of the engine; this is because during shutdown the engine remains hot but may not have all of the cooling systems operating. For example, the combustion section comprises fuel supply lines, fuel injectors, burners and a combustion chamber. In all of these cases the components carry hydrocarbon fuels, oils or their residue and are prone to coking both in use and during shutdown of the engine as these components will maintain the residual heat of the operation for some time after shutdown. Consequently, the management of coking is a complex issue. Furthermore, due to the number and the inaccessibility of the pipes and other components within the engine system it means that cleaning and/or removing the coke deposits is difficult. Typically, such a cleaning would require extensive work and the removal of components from the engine then extensive cleaning either manual or chemical and if that is not successful it will involve the replacement of the component. This increases the cost of maintenance of the engine.

FIG. 2 presents an embodiment of the disclosure that allows for the cleaning of pipe systems or components within an engine. Although this figure is shown for a pipe system the principle can be applied to any component within the engine. The component may be a bearing race, a filter, a pipe, a fuel spray nozzle, or a section of the combustor or any other suitable component. In this system an ultrasonic transducer 24 is physically connected to a section of pipe 25. There may be more than one transducer within the system. There may also be more than one clamping point to the component. The transducers or the clamping points should be coupled normally to the surface to avoid rubbing between the anvil and pipe wall which may induce friction heating. As such the clamping point may be below the transducer or may be offset. For example, there may be two transducers positioned on either side of the pipe whilst a pair of anvil clamps may be orthogonally offset relative to the transducers. The ultrasonic transducer may be coupled in situ to the engine, that is to say either permanently attached to a component within the engine or attached to a component within the engine at rest. The ultrasonic transducer may be coupled to the pipe system using a clamp 26. The clamp may be a saddle clamp as shown in FIG. 2. The saddle clamp may be provided with at least one anvil adapter 27 that contacts a section of pipe. The anvil adaptors allow for effective coupling of the ultrasonic vibrations focus the ultrasonic vibrations from the transducers. There may be any suitable number of anvil adapters positioned around the clamp. Alternatively, the ultrasonic transducer may be directly attached to the component or built into the component. Direct attachment may be through brazing or soldering the transducer to the component. The transducer may be any suitable ultrasonic transducer. In particular, the transducer may be a Langevin type or Tonpilz transducer. Langevin type transducers are transducers in which the one or more piezoelectric elements are compressed between end masses and are desirable because of their power. An interface material or couplant may be placed between the clamp and/or the transducer and device/pipe that is to be cleaned. The interface material or couplant may be standard gels/ greases, as well as sacrificial foils such as aluminium, steel or tin. The use of metal sacrificial foils may be favourable as the coupling coefficient will be higher and eliminates temperature sensitivity that are present in the uses of greases gels etc such as petroleum jelly. Depending on the nature of the component and/or the location of the component within the engine the transducer may be directly coupled to the pipe. Alternatively, any suitable type of clamp may be used. Consequently, in a system involving multiple transducers, some may be fixed in in a difficult to reach position or for certain components and some may be attached by clamps.

FIG. 3 presents an example of a Langevin transducer 30, which may be used in the present disclosure. In this, the bolt 31 runs from the horn 32 to the top with all the components secured to the bolt by a nut 33. The piezoelectric elements 34 and the electrodes 35 are positioned between the horn and the backing plate 36. The horn is used to transmit the ultrasonic vibrations from the piezoelectric elements to the target, which in this case is the component within the engine. The horn 32 is flared in this example to improve acoustic coupling. This avoids problems associated with insulation. In certain cases the discontinuous interface between the horn and the clamp does not provide optimal coupling. In the example shown in FIG. 2 an anvil clamp is used to transmit the ultrasonic vibrations to the pipe. In FIG. 2 the Langevin transducer has a form of construction where two piezo transducers are mounted back-to-back and sandwiched between the backing 36 and horn. Although, this example is presented having two transducers, a Langevin transducer may have any suitable even number of transducers. For example, 2, 4, 6, 8. The Langevin structure positions two ceramic piezoelectric rings in a parallel electrical circuit. These piezoelectric rings are positioned either side of an isolated (positive) contact. These electrodes are placed in between the compression bolt, backing plate and horn plate. The horn plate is used to form the earth contact within the system. The bolt serves both a mechanical and electrical function. Electrically the bolt shorts the outer electrodes. The dimensions and materials of the backing plate and horn plate along with the preloading via the bolt determine the resonant frequency of the transducer. Bolt effectively acts as shorting conductor as well as pre-tension and resonant frequency adjustment. The frequency of the transducer may be selected or tuned to suit the environment in which the transducer is operating. The mechanical function preloads/ stresses the transducers allowing some small adjustment to resonant frequency. More importantly it prevents the piezo elements disintegrating due to unrestrained expansion when the electric field is applied. This arrangement eliminates the need for an insulator that would be susceptible to mechanical and electrical deterioration. For example, the frequency of the transducer may be tuned so that it operates at the resonant frequency of the pipe system or the device/component that is to be cleaned. By tuning to the resonant frequency of the system the cleaning effect of the ultrasonic transducer interacting with the fluid within the component being cleaned is increased. The voltage source to which the transducer is attached may be scannable/tuneable so that the resonant frequency of the system can be found and used. The use of a variable voltage source is also beneficial as the resonant frequency of the system can change depending upon temperature; thus, such a system can be effectively used no matter what the operating conditions. The resonant frequency may be controlled using do bias or alternate set of transducers. The transducer may also be selected to have greater power than other similar comparable designs. The greater power enhances the cleaning effect of the system. The transducer may be mounted in any orientation relative to the pipe or component. However, it may be desirable to position the transducer such that when in operation it produces minimal noise in the system. The noise of the system is a result of a loss of energy and is undesirable. The system may comprise more than one transducer. The system may comprise different types of transducers being used on different types of components. So, for example, a Langevin type transducer may be used on pipe systems and a contact transducer may be used on bearing races. Different transducers may have different amounts of power. The level of power may be selected for the component or the likelihood of coking or the nature of the component.

FIG. 4a presents a schematic setup of the cleaning system according to the present disclosure. A voltage source 41 is used to supply an Alternating Current (AC) and voltage to the transducer 42, which is connected to a pipe 43. The voltage/power source may be isolated and provide a variable output. The voltage/power source may also be able to monitor the output voltage, current, and/or the power. This is desirable as the system can maintain a constant operating point for the transducer during cleaning. The voltage may be passed through a wave form generator. Such a system may include a dual channel arbitrary waveform generator. The waveform generator may act as a signal reference source and can be programmed to provide the necessary frequency sweeps and/or resonance searches to keep the system operating at the resonant frequency. The output of the voltage/ power supply may be fed into an amplifier before the transducer. The amplifier may be any suitable type, for example Class-A, Class-B or class-D amplifiers. Alternatively, the amplifier may be a Royer/Baxandall D resonant oscillator and amplifier or similar resonant oscillator amplifier configuration. With the voltage/power supplied to the transducer it causes vibrations within the transducer in the form of ultrasonic waves. The ultrasonic transducer, when active, produces compressional pressure waves which propagate through the surface of the pipework or component to be cleaned and fluid within them. These ultrasonic waves in turn are transmitted to the component to be cleaned either indirectly through the clamp, or directly in the case of direct attachment of the transducer. The transducer is thus able to produce acoustic pressure waves within these components. The pressure waves travel along the component, in the case of FIG. 4a in the direction of flow. Or if there is no flow in all directions from the point of contact.

The presence of the compressional pressure waves from the transducer generates cavitation in the fluid that is within the pipe or component being cleaned. Cavitation is the result of the difference between the pressure and the displacement over time as shown in FIG. 4b. Cavitation occurs at the point that the pressure is at a minimum and the displacement is at a minimum. Generally, there are two stages of cavitation: i)

formation of vapour bubbles due to a sudden decrease in pressure and ii) cavity growth and collapse. In ultrasonic cleaning, cavitation is used to reduce the cohesion between blocking particles. Thus, this method allows for oxidation products to be broken up and removed. This is due to the collapse of the cavitation bubbles causing pressure waves within the coke layer that has formed on the inner surface of the component. Cavitation within the fluid is beneficial because it can break up larger coke deposits within the component. This means that the broken off components pose less of a risk to equipment downflow than they would do if they broke off the surface of the pipe or the component naturally under the flow of the fluid within. The effect of this is beneficial for areas such as burners or seals where large particles can affect their performance, so any reduction in size of the flake of coke deposit is beneficial. In addition to this, ultrasonic cleaning as opposed to alternative chemical or mechanical cleaning techniques has a number of advantages. A system comprising HPUTs would be inexpensive and highly portable, with little restriction in terms of the size and complexity of components to be cleaned. The environmental impact would be minimal, as there are no harsh chemicals involved. Also, there would be no requirement to halt or interrupt operation of an engine due to the non-invasive nature of this approach.

The fluid in the pipes may be the material that it normally carries, so in the case of fuel lines within a gas turbine engine this would be kerosene or other aviation fuels such as sustainable aviation fuel, or it may be oil that is used within a cooling or lubrication system. Cavitation in kerosene is difficult because of its high viscosity. As such, cavitation in kerosene may require lower frequencies in order to remove the films. However, higher frequencies are useful for continuing the process and reducing particulate size. Therefore, a multi frequency approach may be used. However, the pipe or the component may have the fluid flushed and a separate fluid may be used for the cleaning process. This may be easier for cases in which the components are removed from the engine for cleaning. However, for in situ cleaning the natural fluid in the system may be used. If the component system is flushed, then a cleaning fluid such as deionised water, or deionised water and an additive such as Adblue—a mix of deionised water and urea—may be used. Alternatively, the fluid may be selected for its ability to cavitate. Less viscous materials undergo cavitation more easily than more viscous materials. The fluid whether the fluid already present in the lines, or added later may be static or may be flowing. The cavitation threshold of a fluid can be calculated using the following Equation:

$$p_B = p_o - p_v + \frac{2}{3\sqrt{3}} \sqrt{\frac{\left(\frac{2\sigma}{R_o}\right)^3}{p_o - p_v + \frac{2\sigma}{R_o}}}$$

where $p_o$ is the ambient static pressure (Pa), $p_v$ is the vapour pressure (Pa), $\sigma$ is the liquid surface tension (N/m) and $R_o$ is the initial cavity radius (m). Therefore, increased cleaning performance may be achieved by using a less viscous material than the fluid that is contained within the pipe. However, in certain cases it may not be possible to change the fluid within the component, i.e., within sealed bearing races, in such cases it will always be the fluid that is in them that is used for cavitation.

The ultrasonic cleaning system may be installed on an engine at build or during overhaul. The system may involve the use of a single or of a plurality of transducers positioned either on the same component or positioned on different components within the engine. Alternatively, the transducer (s) could be removably coupled during maintenance of the engine. A user may then move the position of the transducer along and/or around the component, so as to effectively clean the component. In either case the method can be used throughout the life of the engine to clean pipes and components within the engine from the effects of coking. The cleaning system may comprise a plurality of ultrasonic transducer that are positioned on different components around the engine. Each transducer may be connected to its own power/voltage source. Alternatively, multiple individually addressable transducers may be connected to a single power/voltage source. Alternatively, multiple power/voltage sources may be connected to the transducers to allow for failure within the system. In such a case, it may be that the transducers are broken into sets within the engine. Each set relating to similar components and wherein each set is provided with two power/voltage sources and a respective controller. Alternatively, each power/voltage source may address two sets of components. The controllers for the power/voltage sources may be coupled to a computer system that runs a program with cleaning processes for the components programmed into it. The computer program may also be able to compile information from other sources such as temperature probes located throughout the engine and/or the operation time of the engine. The program may use this information to determine when to perform a cleaning cycle for an individual component and/or how long the cleaning program should be run for. The computer program may determine a likelihood of coke formation within a system based upon operation time, number of start and shutdown cycles and the temperature history of the area. The computer program may also be able to store service history of the engine, so that the program can record when the oil has been changed. This information may be fed into the cleaning routine of the components. In the case of adding on the transducers during maintenance a pack of transducers may be associated with set components that can be readily installed onto the engine and can then be coupled to the computer system. As such, the clamps may be designed so that they can be easily connected to the engine. The computer program may include machine learning or AI techniques to enable system learning. This could help to identify the most appropriate times to perform a system clean and/or what type of cleaning is required.

FIG. 5 presents a flow chart of operation of the cleaning method. In step 51 the length of time for the scan is to be determined. The length of time may be determined through a computer program that may control the ultrasonic transducer. Alternatively, it may be determined by a separate determination and the time value run by the system. The determination of the length of time is based upon at least one of the following:

a. the likelihood of coking within the component, b. engine run time and operational information, c. the previous cleaning schedule of the component, d. the available time for the cleaning process to take place, e. temperature: historical data on engine temperature and/or cleaning temperature, f. ambient pressure, g. fluid velocity in pipe, h. consideration of any additives that may be introduced, i. fluid type(s), for example the type of aviation fuel used, oil or the blend.

The likelihood of coking may be determined by the component shape or purpose or from empirical methods from previous components removed from the engine or knowledge of common failure methods. This may be made into a scale of the likelihood of coking. The engine run time may also include the number of shutdown schedules. It may also take into account engine health information such as location of flights and the heat and humidity that the engine has been run at. Temperature information may be for the engine itself and/or for the components or areas local to the component to be cleaned. The cleaning schedule can provide information on the last time that coke had been formed on the component. The previous cleaning schedule may be different for different components within the engine; this may be in terms of frequency, and/or the length of time that the component had previously been cleaned at. A further consideration is the length of time available for cleaning. This may mean that components having a higher chance/ scale of coking may be cleaned more frequently than those that have a lower chance/scale. After this determination the computer program may determine the type of cleaning process that the component will undergo. This could be whether it is a full clean or a partial clean of the component. Full clean is a cleaning cycle that runs for long enough to remove ≥90% of the coke deposits on the wall of the component. A partial clean is cleaning cycle that runs long enough to remove more than 5% of the deposits, but less than 90% of the deposits in the component. The cleaning cycle will depend upon the run time and the intensity of the cleaning. In the second step 52 the conduit, component, or pipe to which the transducer is supplied with a fluid. The fluid does not necessarily fill the pipe, conduit, or component. The fluid may be the standard fluid that the pipe or conduit transports, or alternatively, it may be a separate cleaning fluid that is used in the pipe for cleaning. As discussed above, it may be desirable to use a lower viscosity fluid to clean the pipe or conduit with. The fluid may be that which is permanently within the component. The fluid may be flowing or static. In step 53 a voltage is applied to the ultrasonic transducer. This voltage causes the transducer to vibrate. The voltage supply may be varied so that the transducer operates at the resonant frequency of the system. An alternating and direct voltage and current may be applied to the system. In such a case the alternating current and voltage will excite cavitation, whilst the direct current will bias and alter operational resonant frequency. A system may be applied so that a scan of frequencies is done first, so that the system operates at its resonant frequency. Alternatively, the resonant frequency may be pre-determined, and this frequency is applied. The system may also scan during operation to compensate for any changes in resonant frequency. Changes in resonant frequency may be the result of pressure and/or temperature changes in the fluid or the system. There are several modes of operation that can be used to track the change in resonant frequency due to temperature. Firstly, utilising a MPPT (Maximum Power Point Tracking) algorithm. This works because at resonance the power will be at maximum. The algorithm will seek this point by changing frequency each side of resonance an maintain max power. Secondly, a dc bias which alters the pre-stress loading and resonant frequency can be used. This maintains the resonance at one operational frequency. Additionally or alternatively, to a direct current bias it is possible to introduce a second set of transducers which are operated at DC to vary the static load and hence operational resonance. In another further option there may be two sets of transducers, which operate in series and at different frequencies in a non-resonant (mechanical) mode to improve cavitation in the kerosene. Another alternative is to monitor the complex impedance and/or the phase difference between the voltage and current to maintain resonance. The complex impedance may yield information about the state of the pipework. In step 54 the transducer is switched off. The time period may vary between different cleaning operations. If the fluid is not continuously flowing during the cleaning process, but is static, the fluid may be cleared from the region to remove any removed particles that have been discharged from the wall during the cleaning process. This fluid may be flushed from the system in order to remove any of this material. In the case of a cleaning process in which the fluid has been replaced by a separate cleaning fluid, this can be drained and the original fluid replaced within the pipe or component. Depending upon the size and/or position of the pipes or component camera probes may be used after cleaning to see how effective the process has been. In the case where the engine is undergoing maintenance the transducers may be moved along/around the component and then the cleaning process can be set up again. This movement of the transducers would allow for an entire pipe system to be cleaned during the process. If the system has more than one transducer on different components of the engine then the cleaning times for the different components may vary. In such cases the cleaning times may be based upon a likelihood of coking index, which can be set from engine run time and the position and nature of the components. Such a scale could also allow for cleaning schedules to be determined, so for example components that suffer high coking likelihood are cleaned more frequently than those that are less susceptible. Or alternatively, the components that are more susceptible are cleaned for longer than those that are less susceptible. The system can be used in a standalone means of reducing coking issues from a gas turbine engine or may also be used alongside other methods of reducing coking in the engine. This could be thermal management systems within the fuel and/or oil lines or control over shutdown procedures from the gas turbine engine and how to manage thermal issues with these procedures. The cleaning time may be between 15 and 120 mins. Experimental results have shown that 30 mins deposits of coke have been removed from a pipe sample. After 90 mins the sample was found to have removed all of the coke material from the area around the transducer. Data like this can be fed into the cleaning program for the engine, so that it for heavy coking deposits the cleaning program needs to be run for at least 90 mins, whereas if it is light coking to be removed the program can be set at 30 mins or less. If regular decoking takes place, then the length of time that the cleaning process will undergo will be less. Regular cleaning will be beneficial to the overall engine performance. If there are multiple transducers they may be individually addressable and each transducer may have its own run time determined. This may allow the system to run more than one cleaning program at the same time. If there are more than one transducer on a component they may all be addressed as a single unit, so that the entire component is cleaned with the same program. Alternatively, the transducers may be addressed so that certain areas of the component undergo a shorter or longer cleaning duration.

It will be understood that the invention is not limited to the embodiments above described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A method of decoking a component in a combustion engine having at least one ultrasonic transducer, the method comprising:

determining a length of time for a cleaning process of the component based upon at least one of, likelihood of coking, engine run time, previous cleaning history of the component in the combustion engine, and/or an available time for running the cleaning process, filling the component with a fluid, providing an alternating voltage and current to the at least one ultrasonic transducer for a determined time, decoking the component in the combustion engine by supplying ultrasonic waves from the at least one transducer to the component in the combustion engine, operating at a resonant frequency of the component, the resonant frequency being tracked by altering a frequency of excitation using a Maximum Power Point Tracking algorithm to find and track a resonance of the component as temperature varies in the fluid or the component being cleaned, and stopping a supply of the alternating voltage and the current to the at least one ultrasonic transducer.

2. The method according to claim 1, wherein the alternating current and voltage is supplied by a tunable voltage source, and passed through a waveform generator to drive the at least one ultrasonic transducer at the resonant frequency of the component being cleaned.

3. The method according to claim 1, wherein there are a plurality of ultrasonic transducers including the at least one ultrasonic transducer on a same or different components including the component in the combustion engine.

4. The method according to claim 1, wherein the at least one ultrasonic transducer is clamped to an external surface of the component being cleaned during a scheduled maintenance service.

5. The method according to claim 1, wherein the at least one ultrasonic transducer is permanently connected to the component within the combustion engine.

6. The method according to claim 1, wherein the resonant frequency is maintained by using a DC bias.

7. The method according to claim 1, wherein the at least one ultrasonic transducer is a Langevin transducer or Tonpilz transducer.

8. The method according to claim 7, wherein the Langevin transducer or the Tonpilz transducer is connected to the component via a saddle clamp having at least one anvil adapter.

* * * * *